Nov. 24, 1942.   J. G. MEJEAN   2,302,707
CONNECTING DEVICE FOR ELECTRICAL AND PNEUMATIC CONDUITS
Filed May 12, 1941   2 Sheets-Sheet 1
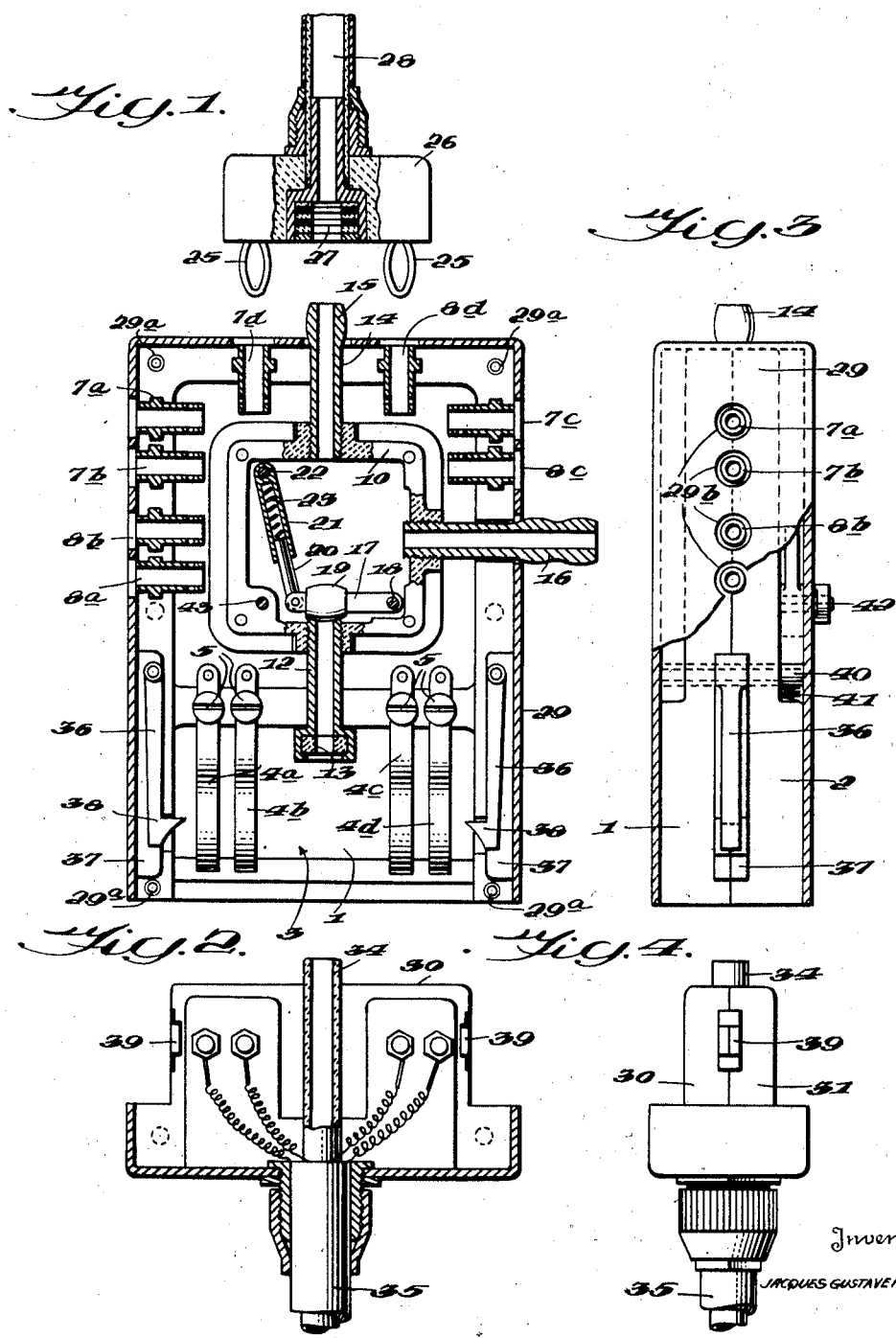
Inventor
JACQUES GUSTAVE MEJEAN,
By Robert B. _____
Attorney Nov. 24, 1942.  J. G. MEJEAN  2,302,707
CONNECTING DEVICE FOR ELECTRICAL AND PNEUMATIC CONDUITS
Filed May 12, 1941  2 Sheets-Sheet 2
Fig. 5.
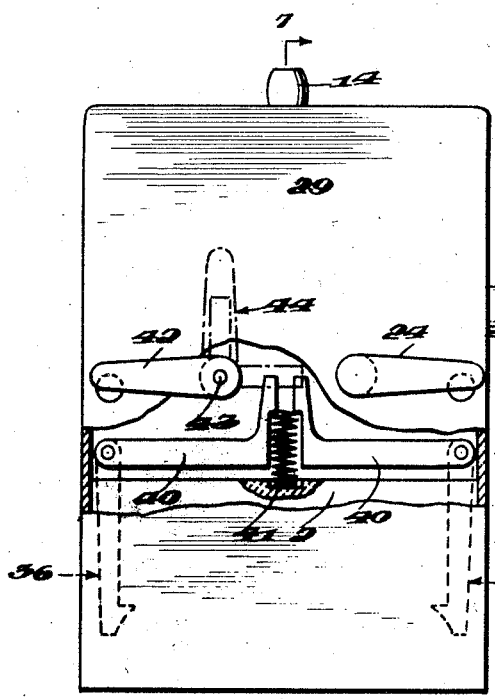
Fig. 7.
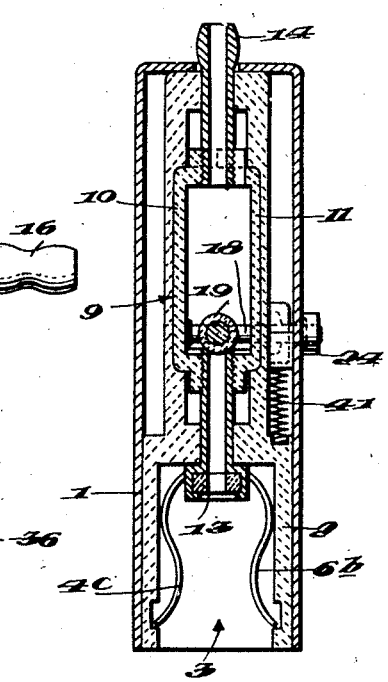
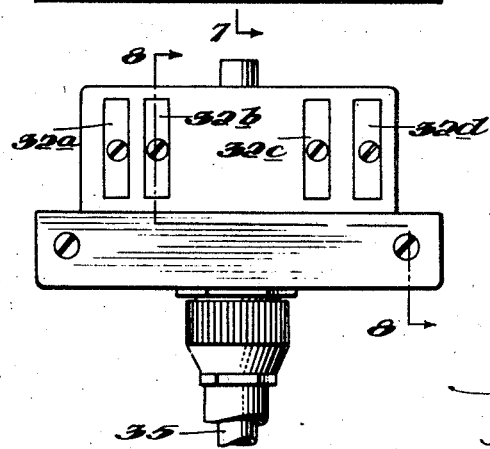
Fig. 6.
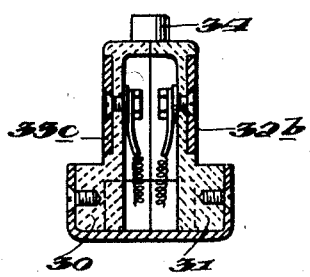
Fig. 8.
Inventor
JACQUES GUSTAVE MEJEAN,
By Robert B. Larson
Attorney Patented Nov. 24, 1942

2,302,707

UNITED STATES PATENT OFFICE 2,302,707

CONNECTING DEVICE FOR ELECTRICAL AND PNEUMATIC CONDUITS

Jacques Gustave Mejean, Geneva, Switzerland

Application May 12, 1941, Serial No. 392,994
In Switzerland September 26, 1940

5 Claims. (Cl. 128—185)

This invention relates to a device for rapidly connecting and disconnecting pneumatic and electrical conduits from their sources of supply. In particular the device is adapted for use in aviation. The present day airplane pilots and crews are provided with oxygen equipment, telephone and radio equipment, and also means for electrically heating their suits. With such equipment, and particularly under conditions of modern warfare, it is obviously necessary to provide effective means whereby that portion of the equipment which is carried on the person of the aviator can be rapidly connected and disconnected from that portion of the equipment which is carried by the aircraft. It is of particular importance that the means for disconnecting be easily, quickly and effectively manipulated since in many instances the aviator has a mere moment in which to make the necessary disconnection before bailing out.

The invention has for its principal object the provision of a compact device which enables the aviator to connect or disconnect electrical and pneumatic equipment carried on his person from the remaining part of this equipment which is carried by the aircraft.

Another object of the invention resides in the provision of a compact device carried by the aviator, and provided with an easily actuated control valve and also means requiring only the moving of a handle to effect a complete disconnecting of the device from that part of the equipment normally carried by the aircraft.

Still another object of the invention is the provision of such a device in which the contacts of the parts to be connected and disconnected are arranged symmetrically from an electrical point of view so that the proper connection is established regardless of the positions of the connecting members at the time of connection.

A further object of the invention resides in the provision of a device of simple construction, which can be easily manufactured, and which is reliable in operation.

Other objects and advantages of the arrangement will be more apparent from the following specification and claims when read in conjunction with the accompanying drawings in which:

Fig. 1 is a side elevation, mostly in cross section, of the device carried by the aviator.

Fig. 2 is a like view of a connecting plug member leading from the equipment on the aircraft and adapted to be connected to the device shown in Fig. 1.

Fig. 3 is an end view, partially in section, of the device shown in Fig. 1.

Fig. 4 is an end view of the device shown in Fig. 2.

Fig. 5 is a front elevational view of the device of Fig. 1 with a casing thereon, portions being broken away to show the releasing mechanism.

Fig. 6 is a side elevation of the device of Fig. 2.

Fig. 7 is a sectional view on the line 7—7 of Fig. 5.

Fig. 8 is a sectional view on the line 8—8 of Fig. 6.

The portion of the device carried by the aviator and usually carried on the chest is comprised of two half shells 1 and 2. This device is provided with a plug receiving recess 3 in which are disposed four resilient blades serving as electrical current leads and contact members. These metal blades or contact members have been designated in the drawings by the reference characters 4a, 4b, 4c and 4d. Each is secured in position by means of a screw 5. The half shells are of insulating material.

The half shell 2 likewise carries four similar resilient contact blades for the same purpose as those just described. These are arranged symmetrically in relation to the first set when the shells are assembled. The contact blades which are disposed in the half shell 2 may be designated as 6a, 6b, 6c and 6d, although only one of these is visible in the drawings (see Fig. 7). The blade 6a is disposed opposite the blade 4b, 6b opposite 4c, 6c opposite 4b, and 6d opposite 4a.

On one of the lateral sides of each of the half shells are four semi-circular cut-outs which form circular openings when the two shells are disposed in assembled relationship. In these circular openings are disposed four sleeves or sockets 7a, 8a, 7b and 8b. These are shown at the left of Fig. 1.

On the opposite side of each of the half shells are two similar semi-circular cut-outs, which when the shells are assembled form circular apertures in which two sleeves 7c and 8c are mounted. On the top side of the assembled shells likewise are two apertures in which sleeves 7d and 8d are mounted. Each of these eight sleeves has a small collar which rests in a groove in the shell halves and which assures its fixed position in the direction of the axis when the half shells are assembled.

Electrical connections (not illustrated) connect the blade 4a to the sleeve 7a, the blade 6a to the sleeve 8a, the blade 4b to the sleeve 7b, the blade 6b to the sleeve 8b, the blade 4c to the sleeve 7c, the blade 6c to the sleeve 8c, the blade 4d to the sleeve 7b, and the blade 6d to the sleeve 8d.

The sleeves described form electrical sockets. It will be noted that these sleeves and the contact blades for the current are arranged so that they can be detached. In practice, moreover, the blades and the sleeves will be disposed in place after they have been soldered to the necessary conductors.

In the central region of each of the half shells 1 and 2 there is provided a bed 9 (see Fig. 7) which receives the body 10 of a two-way valve.

The valve has the form of a square box furnished with a cover 11 fixed to the box by four screws. The reference numeral 12 indicates an intake conduit which is threaded at one end and is screwed into the body 10. The intake conduit 12 has sealing means 13 and opens into the plug receiving space 3 parallel to the general direction of the contact blades or members.

A discharge conduit 14, likewise provided with a threaded end, is screwed into the other end of the body 10. This conduit is provided with an enlarged end 15 which extends in the direction opposite to the conduit 12 and projects slightly beyond the upper confines of the shells. A second intake conduit 16, similar to the preceding one, and likewise screwed into the box 10, extends at right angles to the other two and beyond the lateral confines of the shells.

The valve is a high altitude valve and is formed of the lever 17 which pivots on the pin 18. It is provided with a rubber capsule 19 for the purpose of closing at will one or the other of the intake passages 12 and 16. The free end of the lever 17 is joined to a rod 20 which slides in a tubular member 21 pivoted on a pin 22. Within the tubular member is a compression spring 23 which acts on the end of the rod 20. The pin 18 passes through one of the half shells and is connected on the outside of the device to a handle 24. Operation of the handle thus effects the closing or opening of one or the other of the intake passages 12 or 16.

The valve described is kept in place in the body 9 simply by assembling the two half shells in a manner which will be described hereinafter.

The sleeves or sockets 7a and 8a, as illustrated herein, are intended to be connected respectively to a regular microphone or to a throat microphone which are usually carried by the helmet of the aviator. The sockets 7b and 8b, likewise, are intended to be connected to a telephone. Sockets 7c and 8c are adapted to be connected in the same manner to electrical means for heating the clothing of the aviator. Finally, the sockets 7d and 8d are adapted to receive two contact pins 25 which are integral with a plug 26 (see Fig. 1). The plug 26 has a center socket 27 which is adapted to engage the terminal 15 of the discharge conduit 14 in such manner as to provide a sealed connection. The contact pins 25 are connected to a heating circuit for the oxygen that is lead to the helmet of the pilot (not shown) through the tube 28.

Because of the symmetrical disposition of the sockets on the left side of the device of Fig. 1, it is possible to place the four corresponding connecting pins or plugs on a single mount (not shown). The latter can then be positioned opposite the sockets in either one of two possible symmetrical positions. The aviator, therefore, does not have to hesitate in making the connecting as a suitable connection is made regardless of the manner in which the connecting pins are positioned at the time they are connected.

The two half shells are held in assembled position by means of an outer metal casing 29 and by four screws which enter the openings 29a. The conduit 16, of course, is screwed in after the casing has been put in place. The casing is fixed to one of the two half shells by means of two screws (not shown). The purpose of the casing is to protect the two half shells and at the same time to form an antiparasitic shield for the conductors arranged within. At its sides the casing is provided with openings 29b sufficiently large to prevent any short circuits at the mouths of each of the sockets described.

As previously indicated, the device shown in Figs. 1, 3, 5 and 7 is preferably disposed on the chest of the aviator by means of a strap. The device is adapted to be connected to the equipment on the aircraft through a connecting plug member of the type illustrated in Figs. 2, 4, 6 and 8. This connecting plug member is comprised of two identical half shells 30 and 31 which are held in assembled position by screws. Each of the half shells carries four contact strips intended to cooperate with the contact blades previously described as disposed in the plug receiving recess 3. One of the half shells of the plug member carries the contact strips 32a, 32b, 32c and 32d (see Fig. 6), while the other carries four contact strips 33a, 33b, 33c and 33d, only one of which, 33c, is shown. The contact strip 33a is disposed opposite 32d, 33b opposite 32c, 33c opposite 32b, and 33d opposite 32a. The strips 32a and 33a are connected to the microphone circuit by means of two conductors. The strips 32b and 33b are connected to the telephone circuit by two additional conductors. The contact strips 32c and 33c are connected to a source of current serving the purpose of heating the clothing of the aviator, this connection being assured by two other conductors. Finally, the strips 32d and 33d are connected to a source of current the purpose of which is to heat the oxygen furnished to the aviator, this connection being assured by two other conductors. Figs. 2 and 8 show some of these connections.

The eight conductors in question preferably are wound about a rubber tube 34, for instance, and the whole (that is the conductors and the rubber tube) is placed in a sheath 35. The end of the tube 34 is rigid and is adapted to engage against the packing member 13 of the intake conduit 12 when the connecting plug member 30, 31 is introduced into the open plug receiving recess 3 of the device shown in Figs. 1, 3, 5 and 7. At the moment when the tube 34 engages against the intake passage 12, the blades 4a, 4b, 4c, 4d, 6a, 6b, 6c, and 6d are in contact with the corresponding contact strips carried by the connecting plug member 30, 31. The relative sliding of these blades when the connecting plug member is connected or disconnected cleans the contacts and assures good electrical connections.

The arrangement of the current contact blades of the device and of the corresponding blades of the connecting member, being symmetrical from the electrical point of view with relation to the axis of the intake passage 12 and the mouth of the tube 34, permits the introduction of the connecting plug member in either one of the two possible symmetrical positions without the necessity of making a choice. The invention contemplates an arrangement in which the contact blades, such as 4c, 6b are disposed on the connecting plug member, and the contact strips, such as 33c, 32b are secured to the half shells 1 and 2 within the recess 3.

Recesses 37 are provided in the sides of the two half shells 1 and 2. In these recesses two levers 36 are disposed. These serve the purpose of maintaining the connecting plug member 30, 31, in engaged position. For this purpose these levers are furnished with hooked ends 38 which are adapted to engage in the apertures 39. The apertures are furnished with a metal lining to minimize wear. The levers 36 each have an arm 40 (see Fig. 5) acted on by a common spring 41 so that they tend constantly to assume the position shown in Fig. 1. A handle 42, arranged symmetrically in relation to the handle 24, is connected with a pin 43 carried by the body 19 of the valve, and permits the plug member 30, 31, to be released instantaneously. This is effected through means of an arm 44 moving with the handle 42 and acting on the free ends of the lever arms 40, compressing the spring 41, and thus moving the hooks 38 out of the apertures 39. It is readily apparent that instantaneous release is essential when an aviator must "bail-out."

The tube 34 is connected to an oxygen supply on the aircraft and assures the normal supply of breathing oxygen necessary for the aviator. The conduit 16 is intended to be connected by a tube (not shown) to an emergency oxygen inhaler carried by the aviator. It is apparent that when it is necessary for the aviator to "bail-out," all that it is necessary for him to do is to actuate the handle 42 which disconnects the connecting member 30, 31. If he "bails out" from a very great altitude, he can then connect the passage 16 to a small emergency oxygen tank carried on his person so as to be provided with oxygen during his descent. It should also be noted that the connecting plug member 30, 31 is adapted to be positioned for operation, or removed by a very simple movement and that the removal is in fact aided by its own weight which tends to remove the connecting plug member from the receiving recess in the device as soon as the hooks 38 are removed. The contact blades 4, moreover, exert insufficient pressure to hold the connecting member to the device.

The invention described and illustrated is admirably suited for effecting the objects to which reference has been made. It is simple in construction and easy to manufacture, repair or replace. In operation it is accurate and effective and the operation requires a minimum of thought and movement.

Obviously, changes may be made in the embodiment described without departing from the inventive concept and the invention should not be restricted in scope except as indicated in the claims which follow.

I claim:

1. Connecting means for electrical and pneumatic conduits, comprising, a container having a plug receiving recess, a valve chamber within said container, a pneumatic conduit extending from said recess to said chamber, a pair of pneumatic conduits leading from said valve chamber to the walls of said container, and valve means disposed in said chamber and operable manually from the outside of the container for connecting for opening and closing either the conduit leading from the recess or one of the other conduits, a plug carrying a pneumatic conduit adapted to be connected with the conduit leading from said recess when the plug is inserted in said recess, complementary electrical contacts carried by said container and said plug and adapted to make electrical connections when the plug is inserted in said recess, the electrical conduits carried by said container and said plug being disposed symmetrically from an electrical standpoint, permitting the plug to be inserted in any of its several possible positions, and means for releasably retaining said plug in said recess.

2. A container adapted to be carried on the chest of an aviator and having electrical and pneumatic conduit outlet means for supplying oxygen for breathing purposes and electricity for microphone, telephone, and suit heating, said container having a plug receiving recess, a valve controlled oxygen passage in said container leading from said recess to said pneumatic outlet means, electrical contact members carried by said container and disposed in said recess and connected electrically to said electrical outlet means, said recess being adapted to receive a plug having complementary electric contacts connected with a source of electricity and a conduit connected with a source of oxygen each carried by the aircraft, and means carried by the container and manually operable from the outside of the container for releasably retaining said plug in said recess to establish connection between the electrical and oxygen sources and said electrical and pneumatic outlet means.

3. A device for permitting rapid connection and disconnection of electrical and pneumatic conduits, comprising a container having a plug receiving recess, a plug adapted to be received in said recess, complementary electrical and pneumatic conduits carried by said plug and said container and adapted to connect with each other when the plug is inserted in said recess, and means for releasably retaining said plug in said recess, the electrical conduits carried by said container and said plug being disposed symmetrically from an electrical standpoint, permitting the plug to be inserted in any of its several positions.

4. A device for permitting rapid connection and disconnection of electrical and pneumatic conduits, comprising, a container having a plug receiving recess therein, a valve controlled pneumatic passage extending from the recess through the container, electrical contact members disposed in said recess, a plurality of corresponding electric sockets disposed in the wall of said container and connected electrically to said contact members, a plug member adapted to be received by said recess, a pneumatic conduit in said plug and connected to a source of supply and adapted to connect with the passage in said container when said plug is inserted in said recess, electrical contact members on said plug and connected to sources of electrical current, said contact members on said plug being disposed for engagement with the contact members in said recess when the plug is inserted in said recess, the contact members in said recess and on said plug being disposed symmetrically with respect to the electrical currents to be transmitted, whereby the suitable connections are established regardless of the position of the plug when inserted, means for securing said plug in inserted position, and means for quickly releasing said securing means to permit removal of the plug.

5. A device for permitting rapid connection and disconnection of electrical and pneumatic conduits, comprising a container comprised of two symmetrical half shells of insulating material and an outer covering shield, and container having a plug receiving recess, a plug adapted to be received in said recess, complementary electrical and pneumatic conduits carried by said plug and said container and adapted to connect with each other when the plug is inserted in said recess, and means for releasably retaining said plug in said recess, the electrical conduits carried by said container and said plug being disposed symmetrically from an electrical standpoint permitting the plug to be inserted in any of its several positions.

JACQUES GUSTAVE MEJEAN.